United States Patent [19]

Larosa et al.

[11] Patent Number: 5,280,637
[45] Date of Patent: Jan. 18, 1994

[54] PHASE COMBINING METHOD AND APPARATUS FOR USE IN A DIVERSITY RECEIVER

[75] Inventors: Christopher P. Larosa; Michael J. Carney, both of Palatine, Ill.

[73] Assignee: Motorola, Inc., Schaumburg, Ill.

[21] Appl. No.: 761,527

[22] Filed: Sep. 18, 1991

[51] Int. Cl.$^5$ .............................. H04B 7/02
[52] U.S. Cl. .................... 455/134; 375/100; 455/137; 455/277.1
[58] Field of Search .................... 455/133–135, 137, 139, 277.1, 278.1, 296, 304, 337; 375/85, 86, 100, 102

[56] References Cited

U.S. PATENT DOCUMENTS

| | | | |
|---|---|---|---|
| 4,519,096 | 5/1985 | Cerny, Jr. ............................ | 455/137 |
| 4,884,272 | 11/1989 | McConnell .......................... | 371/43 |
| 4,891,812 | 1/1990 | Bocci et al. ........................ | 375/100 |
| 5,031,193 | 7/1991 | Atkinson et al. ................... | 375/13 |
| 5,109,392 | 4/1992 | McDonald .......................... | 375/85 |
| 5,140,615 | 8/1992 | Jasper et al. ....................... | 375/100 |

FOREIGN PATENT DOCUMENTS 2-253727 3/1989 Japan.

OTHER PUBLICATIONS

*All Digital Adaptive Carrier Tracking Coherent Demodulator*, Shigeki Saito, Harui Yamamoto, Yasushi Yamao. NTT Radio Communication System Laboratories, pp. 9–10.

Primary Examiner—Reinhard J. Eisenzopf
Assistant Examiner—Chi H. Pham
Attorney, Agent, or Firm—Kirk W. Dailey; Rolland R. Hackbart; F. John Motsinger

[57] ABSTRACT

A phase combining method and apparatus for use in a diversity reception radiotelephone is described. The phase combining method and apparatus is a hybrid diversity technique which combines elements of maximal ratio combining (MRC) and level comparison selection diversity, which results in a simple and effective implementation of a diversity receiver with superior performance. The diversity receiver demodulates the received signals, extracts the phase, forming two phase signals. Then, the two phase signals are combined to form a third phase signal. One of the three phase signals is selected to be used for interpretation of a symbol in the Quadrature Phase Shift Keying (QPSK) constellation. The selection process is based on the received signal strength of the received signals.

21 Claims, 4 Drawing Sheets

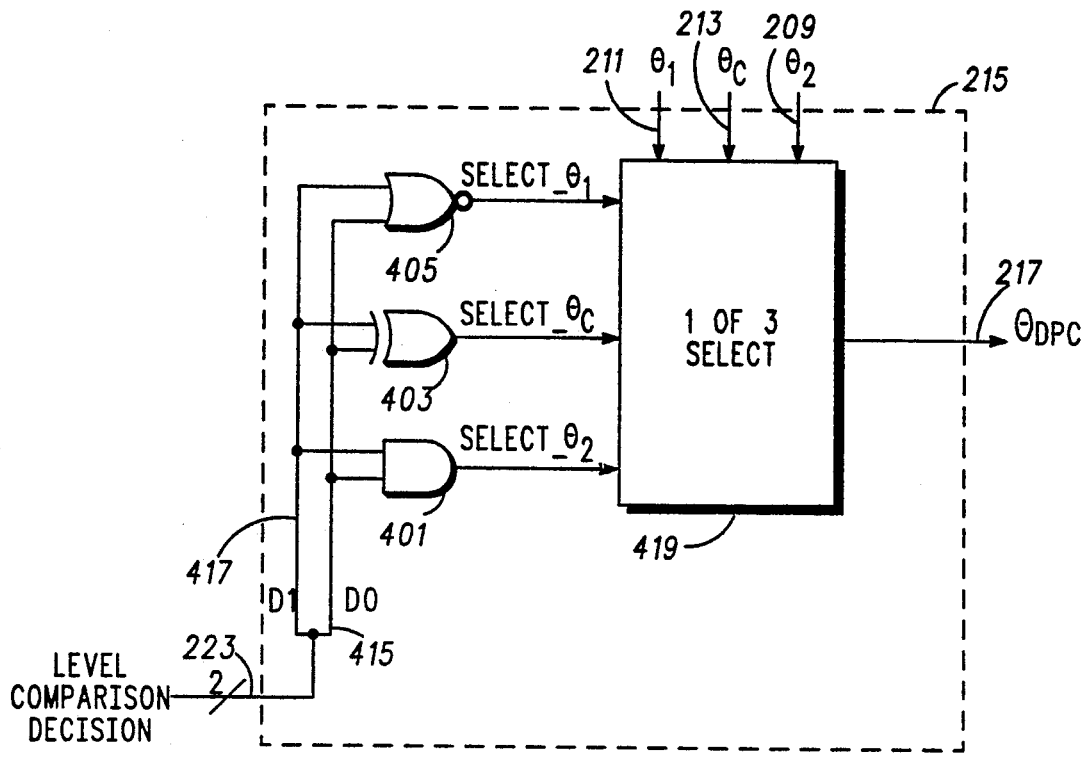
FIG.4
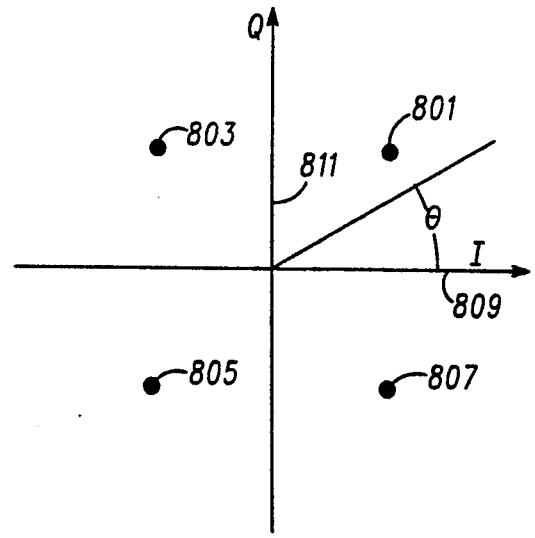
FIG.5
FIG.8

PHASE COMBINING METHOD AND APPARATUS FOR USE IN A DIVERSITY RECEIVER

FIELD OF THE INVENTION

Generally, this invention relates to diversity receivers in radiotelephones and more specifically, to a method and apparatus for combining the phase of at least two received signals resulting in superior performance in a digital or analog radiotelephone.

BACKGROUND OF THE INVENTION

A post-detection selection diversity receiver is one which uses at least two antennas for improved reception of radio frequency (RF) signals. Each antenna and corresponding receiver together generate a received signal. From the at least two received signals available, one of the signals is selected. Generally, there are two types of post-detection selection diversity receivers available today. In the first type, the selection of one the received signals is dependent upon the received signal strength (RSS) of the signals. This type of diversity receiver is known as the level comparison diversity technique. The selection in the second type is dependent upon phase error estimates. This second type of post-detection selection diversity receiver is known as the phase likelihood comparison technique.

In the level comparison diversity technique, the RSS of each received signal is detected and compared to the others. The received signal having the highest RSS value is selected for use by the radiotelephone. This simple system is relatively effective in a Rayleigh fading environment and superior to a system having a single antenna and receiver. However, the level comparison diversity technique does not offer any advantage over a single antenna system in a static environment.

The phase likelihood comparison technique utilizes a phase error estimate from each of the received signals, selecting the signal with the smallest estimated phase error. This embodiment is the subject of a Japanese patent application number HEI2-253727, entitled "Diversity Reception Circuit", assignee Nippon Telegram and Telephone Corporation, filed Mar. 28, 1989. First, the phase of each of the received signals is detected. Next, the phase is plotted onto an appropriate signal constellation. The constellation contains symbol decision points. A phase error vector is created between the plotted phase vector and the nearest symbol decision point. The phase error vector is created for each received signal. The received signal having the smallest phase error vector is used by the radiotelephone for further processing. The other received signals are ignored. Note that the phase likelihood comparison technique does not utilize the RSS information.

An enhancement to the phase likelihood comparison technique is discussed in the paper, *All Digital Adaptive Carrier Tracking Coherent Demodulator*, Shigeki Saito, Harui Yamamoto, Yasushi Yamao. NTT Radio Communication System Laboratories, February, 1991. The enhancement combines the use of RSS information and phase error information for a two branch diversity receiver. The RSS of the received signals are compared to each other. If the difference between the RSS values exceeds a predetermined threshold, then the received signal with the larger RSS value is used. If the difference between the RSS values is less than the predetermined threshold, then the phase error information is used in the aforementioned manner to make the selection. This enhancement offers improved performance over the straight phase likelihood comparison technique; however, further improvement in performance is desirable. Furthermore, the requirement to generate a phase error estimate restricts the phase likelihood comparison technique to digitally phase modulated signals.

The market today is forcing manufacturers of radiotelephones to reduce the size, weight and power consumption of the radiotelephone while increasing the performance criteria. Therefore, a need exists for a simple diversity receiver circuit which has improved received signal performance when compared to the conventions available today.

SUMMARY OF THE INVENTION

The present invention encompasses an apparatus for combining the phase of a first and a second received signal. Each received signal has a phase and a signal quality indicator. The apparatus demodulates the received signals thereby extracting the phase from each received signal, and creating two phase signals. The apparatus combines the two phase signals to form a third phase signal. Then, the apparatus selects the most appropriate one of the three phase signals. The selected phase signal is used to recover the transmitted information.

BRIEF DESCRIPTION OF THE DRAWINGS

FIG. 4 is a phase selection circuit as employed in the block diagram of FIG. 2.

FIG. 5 is a state table for use in the circuit in FIG. 4.

FIG. 8 is a QPSK constellation having a symbol decision point in each quadrant.

DETAILED DESCRIPTION OF A PREFERRED EMBODIMENT

Figure 1:
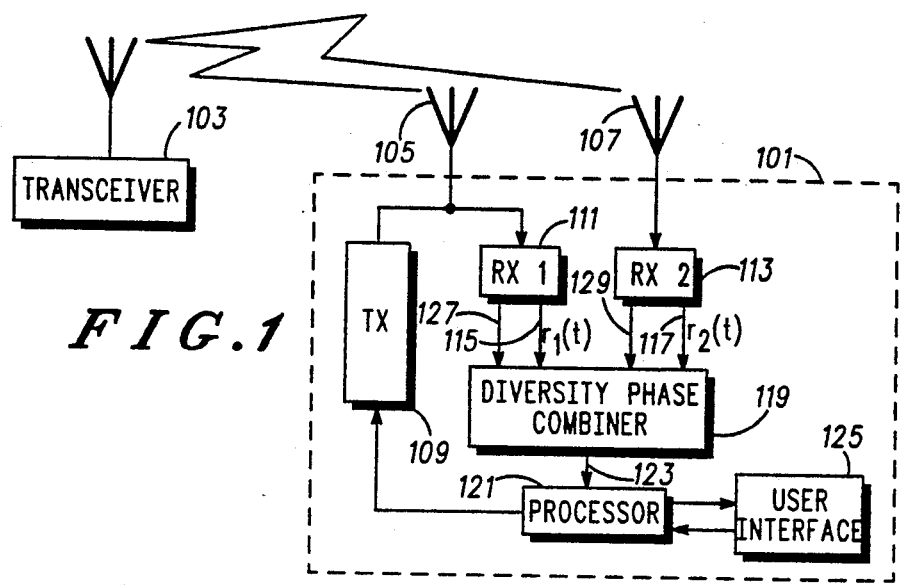
FIG. 1 is a block diagram of a radiotelephone system employing the present invention.

The present invention encompasses a phase combiner circuit for use in a diversity receiver in a radiotelephone. A diversity receiver contains at least two antennas for receiving electromagnetic waves. Each antenna has a corresponding receiver and attempts to receive a signal, resulting in two received signals, each received signal having a phase and signal quality indicator. The phase combiner is used to combine the phase from two received signals creating a third phase signal. The signal quality indicators include RSS, zero crossing jitter, phase error estimates or any other equally sufficient indicator. A selected signal quality indicator or a combination thereof is used to determine which of the three phase signals is to be used in decoding the data contained within the received signals. In the preferred embodiment, the RSS is the chosen signal quality indicator.

Although the present invention can be employed in communication systems using either analog or digital phase modulation schemes, the preferred embodiment described herein operates in a communication system employing a digital radiotelephone. A way in to measure performance in a system employing a digital phase modulation scheme is to measure the bit error rate (BER) of the received signals. This embodiment offers an improvement in the BER of recovered data when comparing it to the aforementioned phase likelihood comparison diversity technique and the level comparison technique.

The performance improvement is achieved by implementing a hybrid diversity technique which combines elements of maximal ratio combining (MRC) and level comparison selection diversity. In fact, phase combining diversity is an effective approximation of MRC. MRC is theoretically the optimum diversity technique; however, a two branch MRC becomes very complex involving multiplication of the received signal and the complex channel gain resulting in the equation stated below:

$$R_{MRC}(t) = [\alpha_1^2(t)s(t) + \alpha_1(t)n'_1(t)] + [\alpha_2^2(t)s(t) + \alpha_2(t)n'_2(t)]$$

where:
$\alpha_i(t)$ is the channel gain,
$n_i(t)$ is complex Gaussian noise,
$s(t)$ is the signal component at the combiner input, and
$n'_1(t)$ and $n'_2(t)$ are phase shifted versions of $n_1(t)$ and $n_2(t)$ with identical statistical properties.

In the case where the two received signal levels differ greatly, $\alpha_1 >> \alpha_2$, or $\alpha_2 >> \alpha_1$, then the MRC output can be approximated by a level comparison selection diversity, namely:

$$R_{MRC}(t) \sim \alpha_1^2(t)s(t) + \alpha_1(t)n'_1(t); \text{ if } \alpha_1 >> \alpha_2, \text{ or}$$

$$R_{MRC}(t) \sim \alpha_2^2(t)s(t) + \alpha_2(t)n'_2(t); \text{ if } \alpha_2 >> \alpha_1.$$

If the two received signals are nearly equal, $\alpha_1 \sim \alpha_2 \sim \alpha$, then the MRC output phase can be approximated by the modulo $-2\pi$ average of the two phase signals as shown below:

$$R_{MRC}(t) \approx [\alpha^2(t)s(t) + \alpha(t)n'_1(t)] + [\alpha^2(t)s(t) + \alpha(t)n'_2(t)]; \text{ if } \alpha_1 \approx \alpha_2 \approx \alpha$$

$$\approx A_1(t)e^{j\theta_1(t)} + A_2(t)e^{j\theta_2(t)}$$

where:
$A_i(t)$ is the individual branch amplitude, and
$\theta_i(t)$ is the individual branch phase
In order to remove the branch amplitude dependencies, the approximation $A_1(t) \sim A_2(t) \sim A(t)$ is used. The identity $1 + e^{jx} = 2\cos(x/2)e^{j(x/2)}$ is used leaving $$\theta_{MRC}(t) \sim [\theta_1(t) + [\theta_2(t) - \theta_1(t)]_{mod2\pi/2}]_{mod2\pi}; \text{ if } \alpha_1 \sim \alpha_2 \sim \alpha.$$

Thus, the phase combining technique implemented herein is an approximation of an ideal maximal ratio combiner output.

FIG. 1 is a block diagram of radiotelephone system which employs the present invention. In the radiotelephone system, the fixed site transceiver 103 sends and receives electromagnetic waves to mobile and portable radio telephones contained within a geographic area. The radiotelephone 101 is one such radiotelephone contained within the geographic area served by the fixed site transceiver 103.

The radiotelephone 101 contains two antennas 105, 107, which couple electromagnetic waves transmitted from the fixed-site transceiver 103, converting them into electrical RF signals. The electrical RF signals are received by the receivers 111, 113 for use within the radiotelephone 101. The received signals contain phase and RSS. The RSS indication is transmitted via signals 127, 129, and the received signals are transmitted via signals 115, 117, from each of the two receivers 111, 113, to the diversity phase combiner 119.

The diversity phase combiner 119 demodulates the received signals 115, 117, thereby recovering the phase from each of the received signals 115, 117 and creating two phase signals. The two phase signals are combined to create a third phase signal. One of the three phase signals is selected to be used to recover the information contained within the received signals 115, 117. The selection of the phase signals is based on the RSS of the two received signals 115, 117. In the preferred embodiment, the selected phase signal is decoded into symbols which are output to the processor 121, such as a MC68000 available from Motorola, Inc. and some accompanying memory, via the symbol signal 123. Other embodiments implemented in an analog system may use equally sufficient demodulation schemes.

The processor 121 is used to format the data between the user interface 125, the transmitter 109 and the receivers 115, 117. The user interface 125 contains a microphone, a speaker and a keypad. Upon reception of the decoded data, the processor 121 uses the data symbols to recreate the voice or the data for use by the user interface 125.

Upon transmission, the data or voice signals are input from the user interface 125 to the processor 121. The signals are digitized, encoded and timed in the processor 121 and sent to the transmitter 109 which converts the data into electrical RF signals. The electrical RF signals are converted into electromagnetic waves and output by antenna 105. The electromagnetic waves are received by the fixed site transceiver 103. In the preferred embodiment, two antennas 105, 107 are used; however, more than two antennas may be used on a given radiotelephone.

Figure 2:
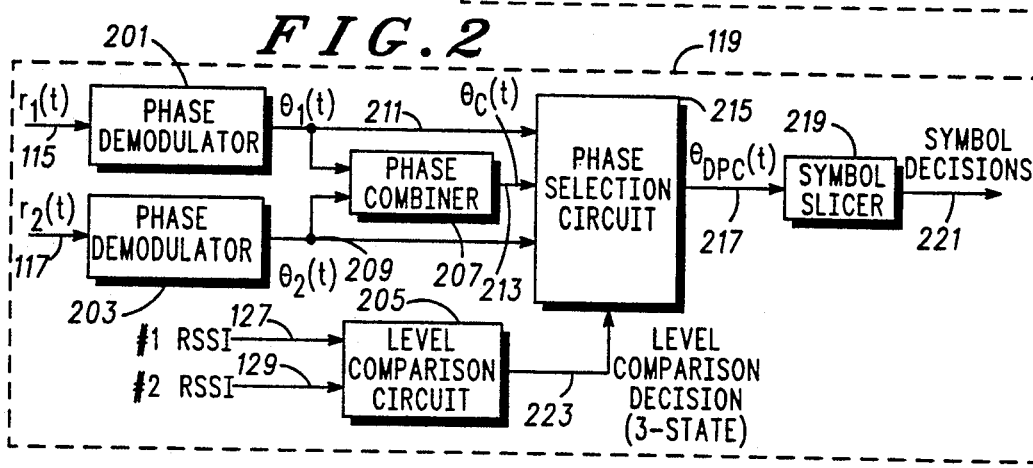
FIG. 2 is a block diagram of a diversity phase combiner as employed in the present invention.

FIG. 2 is a block diagram of the diversity phase combiner 119 of FIG. 1. The received signals 115, 117, are input into individual phase demodulators 201, 203. The phase demodulators 201, 203 create a digital signal corresponding to the phase contained in the received signals 115, 117. The phase signals 211, 209 are input into the phase combiner 207. The phase combiner 207 creates a third phase signal 213 which is a modulo 2-$\pi$ average of the two phase signals 211, 209 input into the phase combiner 207.

Additionally, the phase signals 211, 209 are input into the phase selection circuit 215 which is used to select one phase signal from the three available phase signals 211, 213, 209. The selection of the phase signals is dependent upon the outcome of the level comparison circuit 205.

The level comparison circuit 205 compares the RSS of the first received signal 127 to the RSS of the second received signal 129. If the difference between the RSS of the first received signal and the RSS of the second received signal is greater than a predetermined threshold, then the received signal having the larger RSS is selected with the phase selection circuit 215. If the difference between the RSS of the first received signal and the second received signal is less than the predetermined threshold, then the combined phase signal 213 is selected. In the preferred embodiment, the predetermined threshold is set to 3 dB; however, it may be adjusted for any particular application. The selected phase output signal 217 is input into the symbol slicer 219.

In the preferred embodiment, the symbol slicer 219 is used to determine the information content of the selected signal and is dependent upon the modulation technique of the communication system. A quadrature phase shift keying (QPSK) modulation scheme is utilized. Other embodiments may employ equally sufficient information recovery techniques and modulation techniques such as Gaussian minimum shift keying (GMSK). The determination is made by plotting the phase of the selected signal within the QPSK constellation as illustrated in FIG. 8. The QPSK constellation has four quadrants formed by the I axis 809 and the Q axis 811. The phase is measured starting from the I axis and rotating counterclockwise from 0 to 360 degrees around the four quadrants. Contained in each quadrant is a symbol decision point 801, 803, 805, 807 located 45 degrees between the two axes. The plotted selected phase signal 217 falls within one of the quadrants, and it is interpreted as one of the four possible symbols by choosing the symbol decision point which is closed to its plotted phase vector. For example, a selected phase signal 217 having a phase of 48 degrees would fall in the first quadrant; thus, it would be interpreted as symbol 801. If the selected phase signal 217 had a phase of 91 degrees, then it would be interpreted as symbol 803 from the second quadrant. The symbol decisions are output on signal 221 to the processor 121 for interpretation and reconversion into voice or data.

Figure 3:
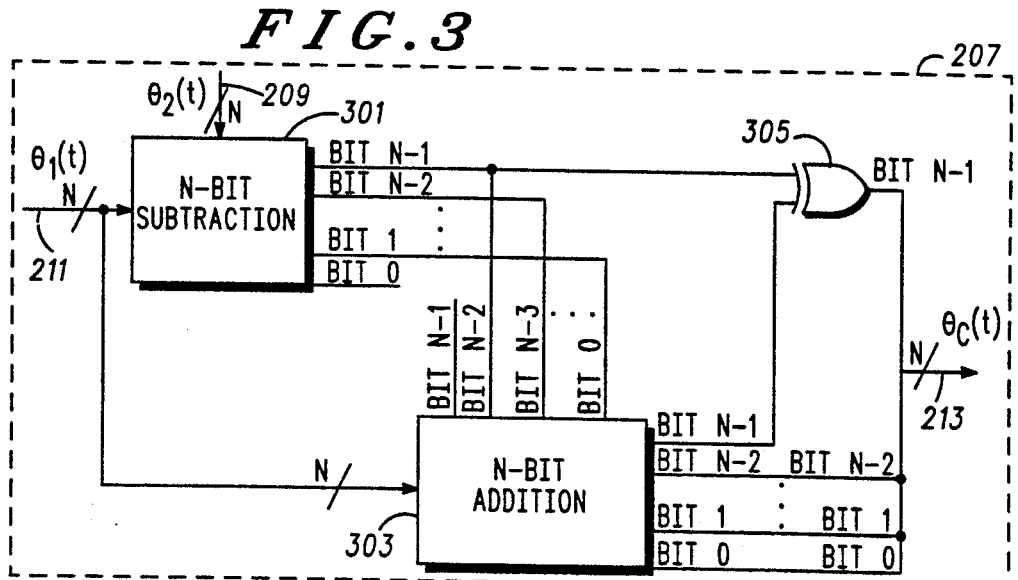
FIG. 3 is a phase combiner as employed in the block diagram of FIG. 2.

FIG. 3 is a block diagram of the phase combiner 207 illustrated in FIG. 2. The phase combiner 207 generates a third phase output signal 213 which is a modulo $2\pi$ average of the two phase signals 209, 211. The implementation of the average consists of modulo arithmetic plus a divide-by-two. It requires only one adder, one subtracter, and a divide-by-two. The phase combiner 207 may be implemented in either a digital signal processor or simple logic hardware.

FIG. 4 is an illustration of the hardware implementation of the phase selection circuit 215 illustrated in FIG. 2. The phase selection circuitry is a three-way multiplexer activated by the result in the level comparison circuit 205. The level comparison circuit 205 inputs a three state, two-bit signal illustrated in the state diagram of FIG. 5. If the phase signal 211 from the first received signal 115 is desired, a 0 is output on signals both D1 and D0. If the phase signal 209 from the second received signal 117 is desired, a 1 is output on signals D1 and D0. If the combined phase signal 213 is desired, then a 0 is output on the signal D1 and a 1 is output on the signal D0, resulting in the proper signal output at 217.

The two branch diversity reception described herein is used to improve performance in a radiotelephone system. The phase combining technique offers performance improvements over the two embodiments discussed in the background, namely, the level comparison diversity and the phase likelihood comparison diversity.

Figure 6:
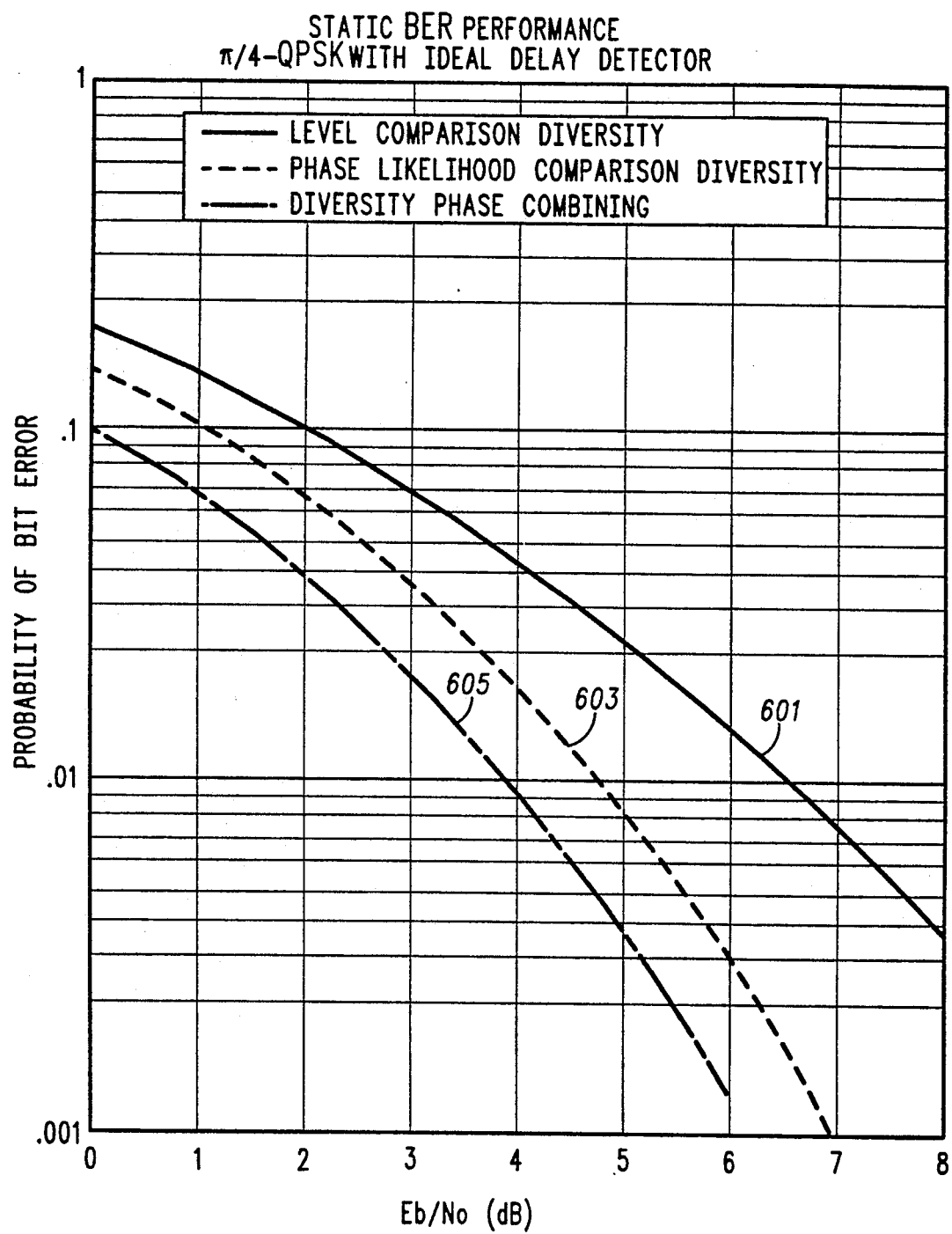
FIG. 6 is a simulated performance chart of bit error probability versus signal-to-noise ratio in a static environment for the present invention, the phase likelihood comparison diversity and the level comparison diversity.
Figure 7:
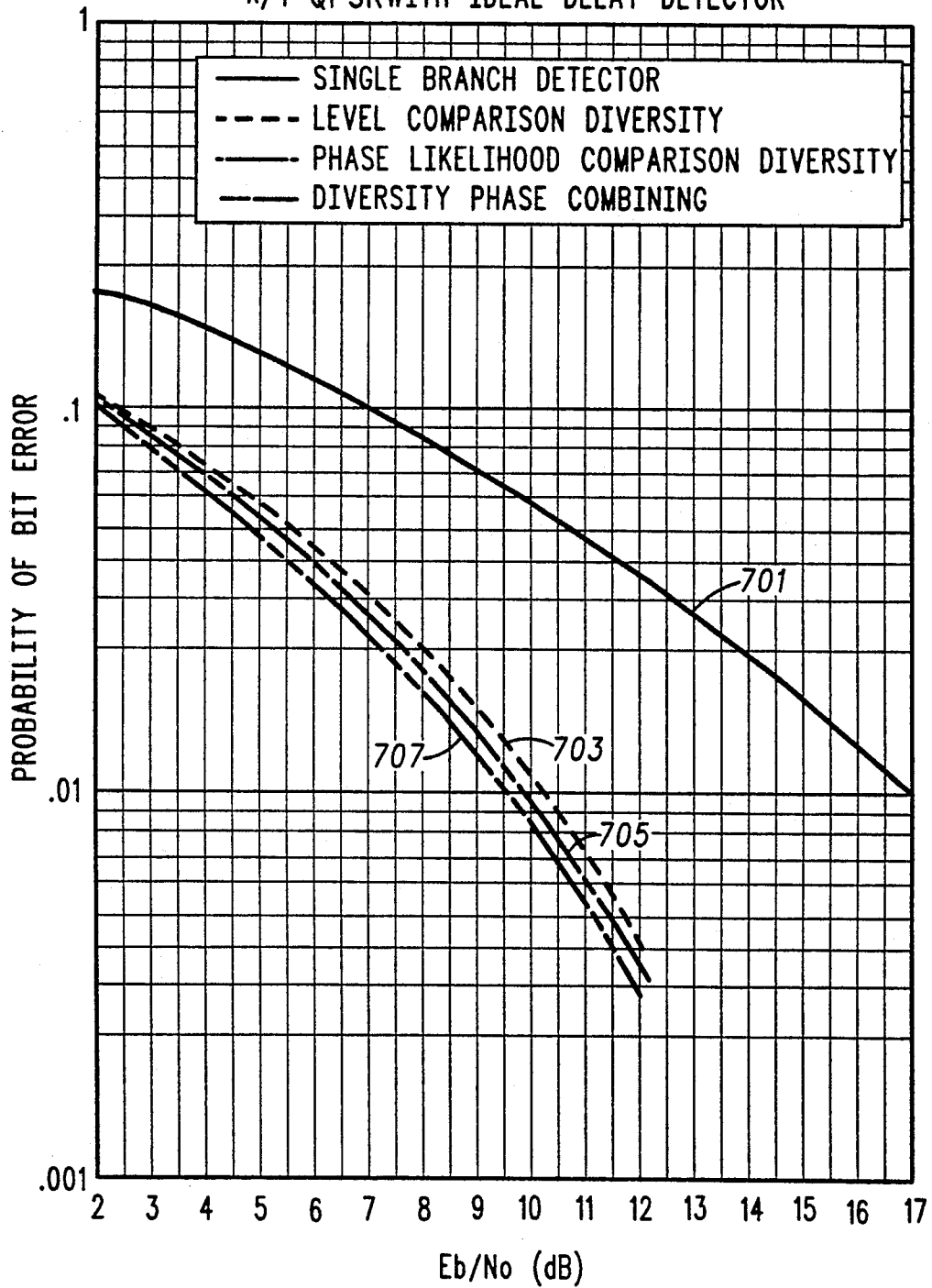
FIG. 7 is a simulated performance chart of bit error probability versus signal-to-noise ratio in a flat Rayleigh fading environment for the present invention, the phase likelihood comparison diversity, the level comparison diversity and a single branch detector.

There are two environments typically used to evaluate performance of diversity reception. First, a static environment is used to simulate a stationary radiotelephone and is characterized by constant, equal level signals at both antennas. Second, a theoretical Rayleigh fading environment is used to simulate the motion of the radiotelephone in a moving car and is characterized by received signals which are modulated with independent Rayleigh distributed random processes. The performance of a diversity receiver as measured by these two criteria illustrate the fundamental performance characteristics of a radiotelephone. FIGS. 6 and 7 are graphical representations of simulated results of single branch detection, level-selection diversity, phase likelihood diversity and the phase combiner diversity in static and Rayleigh fading environments, respectively. The results of FIGS. 6 and 7 assume $\pi/4$ QPSK modulation with ideal delay detection.

FIG. 6 is a graphical representation of probability of bit error versus signal-to-noise ratio of a received signal in the three aforementioned diversity receivers in a static environment. The graph illustrates that the probability of a bit error when using the phase combining diversity receiver is lower than the other diversity receivers aforementioned. The phase combining diversity is shown by the graph 605. The graph 603 illustrates the performance of the phase likelihood comparison diversity as described in the background, and the graph 601 is the simple level comparison diversity performance also discussed in the background of this disclosure. As illustrated in FIG. 6, level comparison selection diversity offers no BER improvement in a static environment relative to a single branch detector. Phase likelihood comparison diversity outperforms level comparison diversity in a static environment, but, it is inferior to phase combining diversity.

The graph FIG. 7 illustrates the probability of a bit error versus signal-to-noise ratio in a Rayleigh fading environment. The results of the level comparison diversity, the phase likelihood comparison diversity and the phase combining diversity are represented by graphs 703, 705 and 707, respectively. All three diversity receivers show a great improvement over a single branch detector 701 in this environment; however, the phase combining diversity receiver maintains a slight performance advantage over the other diversity receivers.

Disclosed is a phase combining diversity technique which offers superior static and Rayleigh faded performance over the aforementioned selection diversity methods. Furthermore, phase combining diversity can be easily implemented in either a digital signal processor or a digital hardware detector. Unlike phase likelihood comparison diversity, phase combining diversity can be employed in systems utilizing either analog or digital phase modulation techniques. Finally, the present invention can be extended to receivers with more than two diversity branches.

What is claimed is:

1. An apparatus for combining at least a first received signal and a second received signal each received signal having a phase and a signal quality indicator, said apparatus comprising:
    means for demodulating the first signal, thereby extracting the phase and creating a first phase signal;
    means for demodulating said second signal, thereby extracting the phase and creating a second phase signal;

means for combining said first phase signal and said second phase signal, forming a third phase signal;

means for selecting a phase signal from the group consisting of said first, said second and said third phase signals; and means for recovering information from said selected phase signal.

2. An apparatus in accordance with claim 1 wherein said means for recovering information further comprises means for selecting a symbol representing said selected phase signal.

3. An apparatus in accordance with claim 1 wherein said means for combining the phase from said first phase signal and said second phase signal further comprises a modulo-$2\pi$ average of said first phase signal and said second phase signal.

4. An apparatus in accordance with claim 1 wherein said means for combining said first phase signal and said second phase signal further comprises an effective maximal ratio combination (MRC).

5. An apparatus in accordance with claim 1 wherein said means for selecting a phase signal from the group consisting of said first, said second and said third phase signals further comprises:

means for comparing the signal quality indicator of the first received signal and the signal quality indicator of the second received signal, including determining a difference between the signal quality indicator of the first received signal and the signal quality indicator of the second received signal and determining the higher signal quality indicator;

means for selecting, upon determining said difference is less than a first predetermined threshold, said third phase signal; and means for selecting, upon determining said difference is greater than said predetermined threshold, the received signal having the higher signal quality indicator.

6. An apparatus in accordance with claim 5 wherein said predetermined threshold is equal to 3 decibels (dB).

7. An apparatus in accordance with claim 5 wherein said signal quality indicator is the received signal strength.

8. A method of combining at least a first received signal and a second received signal, each received signal having a corresponding phase and a signal quality indicator, the method comprising the steps of:

extracting the phase from said first received signal, creating a first phase signal;

extracting the phase from said second received signal, creating a second phase signal;

combining said first phase signal and said second phase signal, forming a third phase signal;

selecting a phase signal from the group consisting of said first, said second and said third phase signals; and recovering information from said selected phase signal.

9. A method in accordance with claim 8 wherein said step of combining said first phase signal and said second phase signal further comprises a modulo-$2\pi$ average thereof.

10. A method in accordance with claim 8 wherein said step of combining said first phase signal and said second phase signal further comprises an effective maximal ratio combination (MRC) thereof.

11. A method in accordance with claim 8 wherein said step of selecting a phase signal from the group consisting of said first, said second and said third phase signals further comprises:

comparing the signal quality indicator of the first received signal and the signal quality indicator of the second received signal, including determining a difference between the signal quality indicator of the first received signal and the signal quality indicator of the second received signal and determining the higher signal quality indicator;

selecting, upon determining said difference is less than a predetermined threshold, said third phase signal; and selecting, upon determining said difference is greater than said predetermined threshold, the received signal having the higher signal quality indicator.

12. A method in accordance with claim 11, wherein said predetermined threshold is equal to 3 decibels (dB).

13. A method in accordance with claim 11 wherein the signal quality indicator is the received signal strength 14. A method in accordance with claim 8 wherein said step of recovering information further comprising selecting a symbol representing said selected phase signal.

15. A radiotelephone including at least a first antenna and a second antenna, at least a first radio frequency (RF) receiver and a second RF receiver and a diversity phase combiner, the first RF receiver and the second RF receiver coupled to the first antenna and the second antenna respectively, the first RF receiver and the second RF receiver outputting a first received signal and a second received signal, each received signal having a received signal strength (RSS) and a phase, the radiotelephone comprising:

means for demodulating said first received signal, thereby extracting the phase and creating a first phase signal;

means for demodulating said second received signal, thereby extracting the phase and creating a second phase signal;

means for combining said first phase signal and said second phase signal, forming a third phase signal;

means for selecting a phase signal from the group consisting of said first, said second and said third phase signals;

means for selecting a symbol representing said selected phase signal;

means for formatting said selected symbols into a sound pattern; and means for communicating said sound pattern to a user.

16. A radiotelephone in accordance with claim 15 wherein said means for combining said first phase signal and said second phase signal further comprises a modulo-$2\pi$ average of said first phase signal and said second phase signal.

17. A radiotelephone in accordance with claim 15 wherein said means for combining said first phase signal and said second phase signal further comprises an effective maximal ratio combination (MRC) thereof.

18. A radiotelephone in accordance with claim 15 wherein said means for selecting a phase signal from the group consisting of said first, said second and said third phase signals further comprising:

means for comparing the RSS of the first received signal and the RSS of the second received signal, including determining a difference between the RSS of the first signal and the RSS of the second signal and determining the larger RSS;

means for selecting, upon determining said difference is less than a predetermined threshold, said third phase signal; and means for selecting, upon determining said difference is greater than said predetermined threshold, the received signal having the larger RSS.

19. A radiotelephone in accordance with claim 18, wherein said predetermined threshold is 3 decibels (dB).

20. A radiotelephone in accordance with claim 15 wherein said means for communicating is an user interface.

21. A radiotelephone in accordance with claim 15 wherein said means for formatting further comprises a microprocessor and a memory device.

* * * * *